PULSE GENERATING ELECTRICAL CIRCUIT ARRANGEMENTS

Filed Oct. 10, 1955

INVENTOR:
WILLIAM S. MELVILLE,
BY Michael Masnik
HIS AGENT.

United States Patent Office 2,869,004

Patented Jan. 13, 1959

2,869,004

PULSE GENERATING ELECTRICAL CIRCUIT ARRANGEMENTS

William S. Melville, Rugby, England, assignor to The British Thomson-Houston Company Limited, a British company Application October 10, 1955, Serial No. 539,586

Claims priority, application Great Britain December 17, 1954

18 Claims. (Cl. 307—108)

This invention relates to pulse generating circuits, and more particularly to pulse generating circuits for the production of recurrent pulses of high peak voltage or current and short duration.

Pulse generating circuits comprising a plurality of saturable reactor elements have been used with considerable success in this field. In such circuits, cascaded saturable reactor networks are so arranged that each network will store and discharge signal energy from the signal source. By correct dimensioning of the reactor elements the discharge into a subsequent network element can be made in a much shorter time period than that required for storage. Since the energy transferred between each cascaded stage is substantially the same, the decrease in time of transfer results in an increased signal amplitude. For details of the operation of a circuit of this type, reference can be made to my British Patent No. 666,574, entitled "Improvements in the Use of Saturable Magnetic Chokes as Discharge Devices," published February 13, 1952, on an application filed November 15, 1948.

In many previous applications of such signal shaping networks, a large number of stages are required to give an output pulse having the required characteristics.

Therefore, it is one object of this invention to reduce the number of stages necessary to produce a required output signal pulse.

The second object of this invention is to provide a simple pulse forming network which is highly efficient in operation.

A further object of this invention is to provide an arrangement for the production of desirable signals.

A further object of this invention is to provide an improved signal processing arrangement.

One embodiment of a pulse generating circuit in accordance with the present invention comprises a signal storage circuit, a signal shaping network, and a switch to couple the signal storage network to the signal shaping network. The switch connects the signal shaping network to the signal storage network when the signal stored in said storage network reaches a desirable level. The abrupt application of the stored signal shortens the signal width at the input to the signal shaping network such that fewer reactor sections are needed for shaping to the desired pulse width.

In another embodiment of this invention, cascaded saturable core transformers compose the signal shaping network. In such an embodiment the signal voltage or current amplitude can be greatly increased to meet the needs of a particular application.

The features of my invention, which I believe to be novel, are set forth with particularity in the appended claims. My invention, itself, however, both as to its organization and method of operation, together with other objects and advantages, may best be understood by reference to the following description taken in connection with the accompanying drawings, in which:

Figure 1:
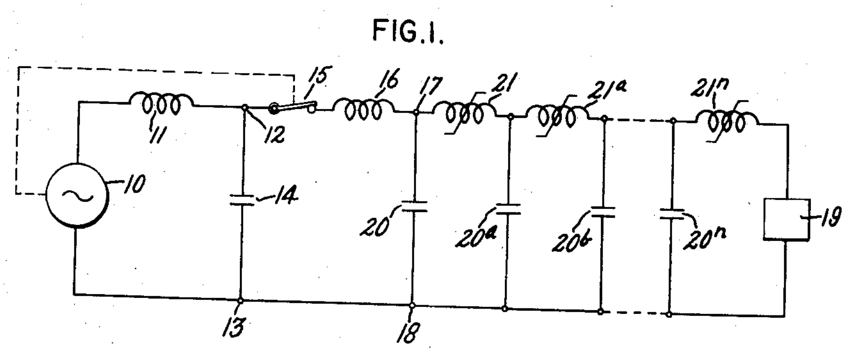
Figure 1 is a schematic diagram of a pulse generating circuit embodying the present invention.

In Figure 1 of the drawings, one embodiment of the pulse generating network, constructed in accordance with the present invention, is shown to include an undulating signal source 10, such as an oscillation generator, having one of its terminals connected through an inductor 11 to terminal 12. The remaining terminal of source 10 is connected directly to the terminal 13. A capacitor 14 is connected across terminals 12 and 13. Terminal 12 is connected through a switching device 15 and an inductance 16 to terminal 17. Terminal 13 is directly connected to terminal 18. A plurality of impedance sections are interposed between the load 19 and terminals 17 and 18. Each section comprises a capacitor 20 and a saturable inductor 21, connected to the terminals 17 and 18 in the preceding section.

The switching device 15 remains substantially an open circuit during charging of capacitor 14. When the charge on capacitor 14 reaches predetermined level, such as a maximum, the switching device operates to become a short circuit, connecting the signal shaping network to the capacitor 14.

As a result of the switch closure, current surges through inductor 16 into capacitor 20. The saturable core inductor 21 effectively blocks current flow into capacitor 20 until the charge on capacitor 20 reaches a maximum. When the signal maximum across capacitor 20 is reached, inductor 21 saturates, allowing discharge of capacitor 20 into capacitor **20*a***.

In each section of the signal shaping network, therefore, signal energy is stored until the saturable inductor of the next stage saturates. When the inductor saturates, the stored energy is transferred to the subsequent stage. Since the inductance of each stage is less than the inductance of the preceding stage, the time of transfer is decreased. Since the total signal energy remains substantially constant in the transfer, the amplitude of the signal is increased by each transfer. For details of the operation and construction of saturable inductors, reference may be made to my above mentioned patent.

The use of a switch in the input to the signal shaping network reduces the number of stages necessary to obtain an output with the desired pulse duration, since the switch will mechanically limit the signal applied to the shaping network. Inductor 16 is dimensioned to limit the current flow rate to the capabilities of the switch.

For illustration of one specific embodiment, source 10 can be a rotating armature generator of sinusoidal electrical signals. Capacitor 14 and inductor 11 are tuned substantially to the frequency of the sinusoidal source. By tuning the capacitor 14 and inductor 11 to resonance, a desired amplification of the source signal is obtained.

With such a source, the switch may be a magneto-type switch operated by a cam on the shaft of the generator armature, or on a shaft of a remote motor synchronously rotating with the generator. Alternately, the switch can be an electron discharge device, such as a vacuum tube with control means to drive the tube to conduct when the stored signal reaches a desirable level.

Because the input section of the shaping network operates at relatively low voltage, simple switches or tubes can be employed to give the desired result. The advantage of saturable reactors as a switching device for handling the higher voltage at the faster switching rate necessary in the later stages of the shaping network is retained.

Figure 2:
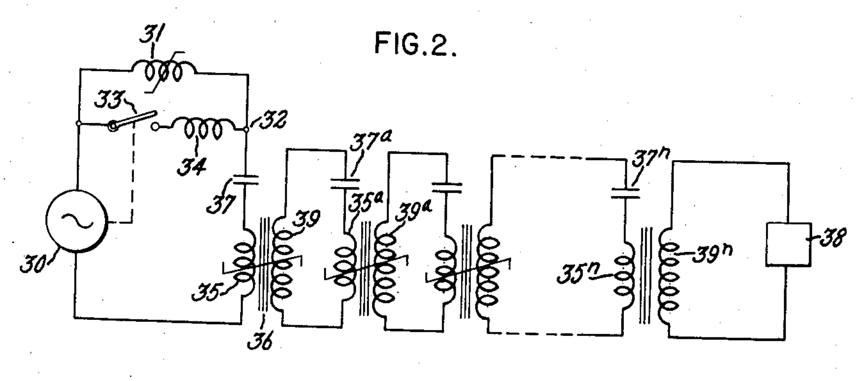
Figure 2 is a schematic diagram of a modification of the circuit shown in Figure 1 wherein saturable core transformers are employed.

In Figure 2 is shown a further embodiment using a plurality of cascaded saturable core transformers for pulse shaping. This circuit is shown to include a signal source 30 connected through a saturable inductor 31 to terminal 32. A switching device 33 and a linear inductor 34 is connected in shunt across the saturable inductor 31. The other terminal of source 30 is connected through the primary 35 of the saturable transformer 36 and capacitor 37 to terminal 32. A plurality of saturable core transformer sections are interposed between the load 38 and the secondary 39 of the first transformer. The relative values and characteristics of the components are determined as follows:

The unsaturated inductance of the transformer primary 35 is low compared to the unsaturated impedance of inductor 31, but high compared with the saturated value of inductor 31. Similarly, the unsaturated inductance of the transformer primary 36*a* is low compared to the unsaturated secondary inductance 39, but high compared with its saturated value. The transformers may be arranged to step up or step down the voltage depending on the requirements of the output system. For example, in a radar transmitter, the source voltage may be comparatively low and by progressive step up, the output pulse to the magnetron might reach a magnitude of tens of kilovolts.

In a preferred embodiment, capacitor 37 is tuned with the unsaturated inductance of inductor 31 and the primary winding 35. Capacitor 37*a* is dimensioned so that its capacitance is approximately equal, when referred to the primary winding of transformer 36, to the capacitance of capacitor 37.

In operation, capacitor 37 is charged from the source through the unsaturated inductance 31. Since the inductance of the primary is low, very little voltage appears across it during charging of capacitor 37. When the charge on the capacitor 37 reaches a maximum, switch 33 closes. The capacitor 37 will suddenly discharge through the switch 33. The value of the discharge current is limited to the switch capacity by the indicator 34. The surge will charge capacitor 37*a* through the transformer coupling.

When the charge on the capacitor 37*a* reaches a maximum, the core of transformer 36 saturates, the secondary winding 39 becomes a low impedance, and the capacitor 37*a* discharges through the primary of transformer 36*a*. The process, when repeated in succeeding stages, shapes the signal in a desirable manner for application to the load 38.

The use of a switch in such a circuit permits a much smaller and less expensive saturable inductor to be used while efficient operation is maintained. Also, the abrupt discharge in the first stage, effected by the switch closure, lessens the number of saturable transformer stages required for signal shaping.

Figure 3:
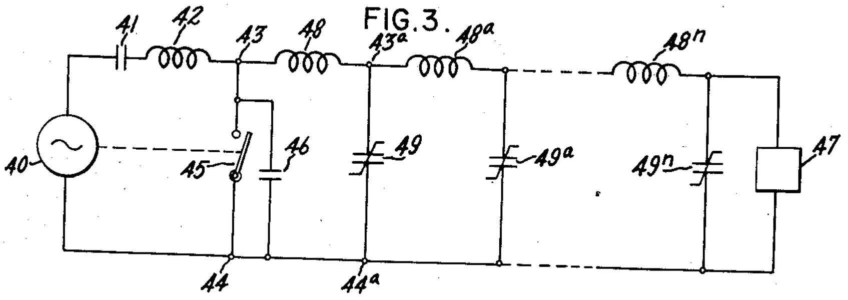
Figure 3 is a schematic diagram of another modification of the circuit shown in Figure 1.

In Figure 3 is shown a further embodiment using saturable capacitors and linear inductors. In this circuit is shown a source 40 connected through a capacitor 41 and inductor 42 to terminal 43. The second terminal of the source 10 is connected to terminal 44. The switch device 45 is connected across the terminals 43 and 44 and capacitor 46 is connected in shunt with the switch 45. A plurality of impedance sections are connected between the load 47 and terminals 43 and 44. Each impedance section comprises an inductor 48 and a saturable capacitor 49 connected across terminals 43 and 44 of the preceding section. In one embodiment, the inductances 48 were of equal value and the saturable capacitors were dimensioned to be of progressively reduced capacitance. Inductor 42, capacitor 41, and capacitor 45 are dimensioned to be resonant at the frequency of the source 10. By dimensioning the capacitors 49 so they are of progressively smaller capacitance value, the initial pulse entering the signal shaping network, which is of long time duration, is progressively shaped to a pulse of higher amplitude and shorter duration. For details of the operation of saturable capacitors in a circuit of this nature, reference may be made to my patent, No. 2,689,311, entitled "Pulse Generating Circuit," September 14, 1954.

As before, the use of a controlled switch device 46 allows substantial reduction in the number of stages necessary for deriving a given duration of signal output.

The switch is, in one embodiment, a magneto-type cam operated switch controlled by rotation of the armature on the source. The switch remains closed during charging of the storage circuit comprising inductor 42 and capacitor 41. When the signal stored in the inductor reaches a predetermined value, such as a maximum, the switch opens. Capacitor 46 prevents rate of rise of voltage in excess of switch capability.

By this operation, a voltage surge, having fast rise time, is introduced into the signal shaping network. Thus, the number of stages for a desirable signal output is reduced as compared to prior circuits. The advantages of the saturable capacitors in handling high voltages at rapid, self controlled switching rates is retained.

Although not described in the drawings, the switch means, as for example 15 of Figure 1, may be adapted to respond to certain signal conditions in the energy storage circuit 11 and 14 for coupling stored energy from 14 to the succeeding shaping networks. Biased diodes, gas discharge devices, etc., are available to perform switching functions at desired signal levels.

While particular embodiments of the present invention have been shown and described, it will be obvious to those skilled in the art that changes and modifications may be made without departing from the invention in its broader aspects, and, therefore, the aim in the appended claims is to cover all such changes and modifications that fall within the true spirit and scope of the invention.

What I claim and desire to secure by Letters Patent of the United States is:

1. In combination, an energy storage circuit, means for applying energy to said circuit to be stored comprising a source of undulating energy, a signal shaping network having input and output terminals, said signal shaping circuit comprising a saturable reactor circuit, a load circuit coupled to said output terminals, and means for improving the signal shaping performed by said network comprising means operative only when said stored energy reaches a desired level for abruptly applying said stored energy to said input terminals.

2. In combination, a source of undulating energy, an energy storage circuit coupled to said source for storing energy, said energy storage circuit comprising a linear inductance and linear capacitance substantially tuned to the undulating frequency of said source, a signal shaping network having input and output terminals, a load circuit coupled to said output terminals, and short circuiting means responsive to the undulation recurrence rate of said undulating energy for conductively connecting said energy storage circuit to said input terminals.

3. In combination, a source of undulating energy, an energy storage circuit coupled to said source for storing energy, a signal shaping network having input and output terminals, said signal shaping network comprising saturable reactors, a load circuit coupled to said output terminals, and switch means synchronized with the frequency of said undulating energy for abruptly applying said stored energy to said input terminals.

4. In combination, a source of undulating energy, an energy storage circuit coupled to said source for storing energy, a signal shaping network having input and output terminals, said signal shaping network comprising at least one series coupled saturable inductor and one shunt connected saturable capacitor, a load circuit coupled to said output terminals, and switch means to conductively connect said energy storage circuit to said input terminals when said stored energy reaches a desirable level.

5. In combination, a source of undulating energy, an energy storage circuit coupled to said source for storing energy, a signal shaping network having input and output terminals, said signal shaping network comprising a multiple pi network with a saturable inductance in the series arm and capacitors in the shunt arms, a load circuit coupled to said output terminals, and switch means to conductively connect said energy storage circuit to said input terminals when said stored energy reaches a desirable level.

6. In combination, a source of undulating energy, an energy storage circuit coupled to said source for storing energy, a signal shaping network having input and output terminals, comprising a multiple T network with saturable inductances in the series arms and a capacitor in the shunt arm, a load circuit coupled to said output terminals, and switch means to conductively connect said energy storage circuit to said input terminals when said stored energy reaches a desirable level.

7. In combination, a source of undulating energy, an energy storage circuit coupled to said source for storing energy, a signal shaping network having input and output terminals, said signal shaping network comprising a multiple pi network with an inductance in the series arm and saturable capacitors in the shunt arms, a load circuit coupled to said output terminals, and switch means to conductively connect said energy storage circuit to said input terminals when said stored energy reaches a desirable level.

8. In combination, a source of undulating energy, an energy storage circuit coupled to said source for storing energy, a signal shaping network having input and output terminals, said signal shaping network comprising a multiple T network with inductors in the series arm and a saturable capacitor in the shunt arms, a load circuit coupled to said output terminals, and switch means to conductively connect said energy storage circuit to said input terminals when said stored energy reaches a desirable level.

9. In combination, a source of undulating energy, an energy storage circuit coupled to said source for storing energy, a signal shaping network having input and output terminals, said signal shaping network comprising a multiple T network with saturable inductors in the series arms and a saturable capacitor in the shunt arms, a load circuit coupled to said output terminals, and switch means to conductively connect said energy storage circuit to said input terminals when said stored energy reaches a desirable level.

10. In combination, a source of undulating energy, an energy storage circuit coupled to said source for storing energy, a signal shaping network having input and output terminals, said signal shaping network comprising a multiple pi network with a saturable inductor in the series arm and saturable capacitors in the shunt arms, a load circuit coupled to said output terminals, and switch means to conductively connect said energy storage circuit to said input terminals when said stored energy reaches a desirable level.

11. In combination, a source of undulating energy, an energy storage circuit coupled to said source for storing energy, a signal shaping network having input and output terminals, a load circuit coupled to said output terminals, switch means conductively connecting said energy storage circuit to said input terminals when the stored energy reaches a desirable level, said switch means comprising a switch adapted to operate in synchronism with predetermined undulations of said source.

12. In combination, a source of undulating energy, an energy storage circuit coupled to said source for storing energy, a signal shaping network having input and output terminals, an output circuit coupled to said output terminals, switch means conductively connecting said energy storage circuit to said input terminals when the stored energy reaches a desirable level, said switch means comprising a cam switch adapted to be operated by said source.

13. In combination, a source of undulating energy, an energy storage circuit coupled to said source for storing energy, a signal shaping network having input and output terminals, an output circuit coupled to said output terminals, switch means conductively connecting said energy storage circuit to said input terminals when said stored energy reaches a desirable level, said switch means comprising a mechanically operated, electric switch synchronously driven by said source.

14. In combination, a signal forming network, a signal source, a signal storage network coupled to said source for storing signals, a signal shaping network, means coupling said signal shaping network to said storage network, and an output circuit coupled to said signal shaping network, said means comprising a switching device to conductively connect said storage network to said signal shaping network when a desirable signal is stored in said storage network.

15. In combination, a signal source, a signal storage network coupled to said source for storing signals, a signal shaping network, means coupling said signal shaping network to said storage network, and a load circuit coupled to said signal shaping network, said means comprising a switching device to conductively connect said storage circuit to said signal shaping network in synchronism with the signals supplied by said signal source.

16. In combination, a source of undulating signals, a signal shaping network, said network comprising signal saturable circuit elements, adapted to store applied signals and then to transfer said stored signals in a shorter time period than that required for storage, switching means controlled by said source to intermittently apply signals from said source to said network, and an output circuit coupled to said network to receive said transferred signals.

17. In combination, a source of undulating energy having a first and second terminal, a signal shaping network having a first and a second input terminal and output terminals, said signal shaping network comprising cascaded saturable core transformers, a load circuit coupled to said output terminals, and means for intermittently applying signals from said source to said input terminals comprising a serially connected saturable inductance and a capacitance connected between said first terminal of said source and said first input terminal, means coupling said second terminal of said source to said second input terminal, and means for intermittently connecting said first terminal of said source directly to the junction between said saturable inductance and said capacitance.

18. In combination, a source of undulating signals, a signal shaping network, said network comprising cascaded signal saturable core transformers adapted to store applied signals and then to transfer said stored signals in a shorter time period than that required for storage, switching means controlled by said source to intermittently apply signals from said source to said network, and an output circuit coupled to said network to receive said transferred signals.

References Cited in the file of this patent

UNITED STATES PATENTS

| | | |
|---|---|---|
| 2,405,070 | Tonks et al. | July 30, 1946 |
| 2,419,201 | Crump et al. | Apr. 22, 1947 |
| 2,419,227 | Peterson | Apr. 22, 1947 |
| 2,439,389 | Hussey | Apr. 13, 1948 |
| 2,561,897 | White | July 24, 1951 |
| 2,787,755 | Smith | Apr. 2, 1957 |